United States Patent [19]

Anderson et al.

[11] 4,095,761
[45] Jun. 20, 1978

[54] AERIAL REFUELING SPOILER

[75] Inventors: Ardell J. Anderson, Redmond; Kenneth D. Hurley, Bellevue; Richard H. Leckman, Seattle; Ronald H. Robinson; Edward N. Tinoco, both of Bellevue, all of Wash.

[73] Assignee: The Boeing Company, Seattle, Wash.

[21] Appl. No.: 727,739

[22] Filed: Sep. 29, 1976

[51] Int. Cl.² .................................... B64D 39/00
[52] U.S. Cl. ............................. 244/135 A; 244/130
[58] Field of Search ............... 244/135 R, 135 A, 130, 244/42 D, 91, 40 R, 40 A, 41, 113, 3, 45 A, 89, 213, 198, 199, 200

[56] References Cited

U.S. PATENT DOCUMENTS

| 2,663,523 | 12/1953 | Leisy | 244/135 A |
| 2,849,200 | 8/1958 | Person | 244/135 A |
| 3,025,027 | 3/1962 | Ferreira | 244/91 |
| 3,680,816 | 8/1972 | Mello | 244/89 |
| 3,917,196 | 11/1975 | Pond et al. | 244/135 A |

Primary Examiner—Barry L. Kelmachter
Attorney, Agent, or Firm—Al Richardson; B. A. Donahue; Daniel T. Anderson

[57] ABSTRACT

An aerodynamic spoiler mounted on the upper forward surface of the fuselage of an aircraft which is equipped to be refueled by another aircraft while in flight. The spoiler counteracts aerodynamic disturbances produced by the refueling boom and the resultant instabilities in pitch in the aircraft receiving fuel. Four species of the spoiler are disclosed and the device may be made retractable to eliminate drag when not in use.

5 Claims, 12 Drawing Figures

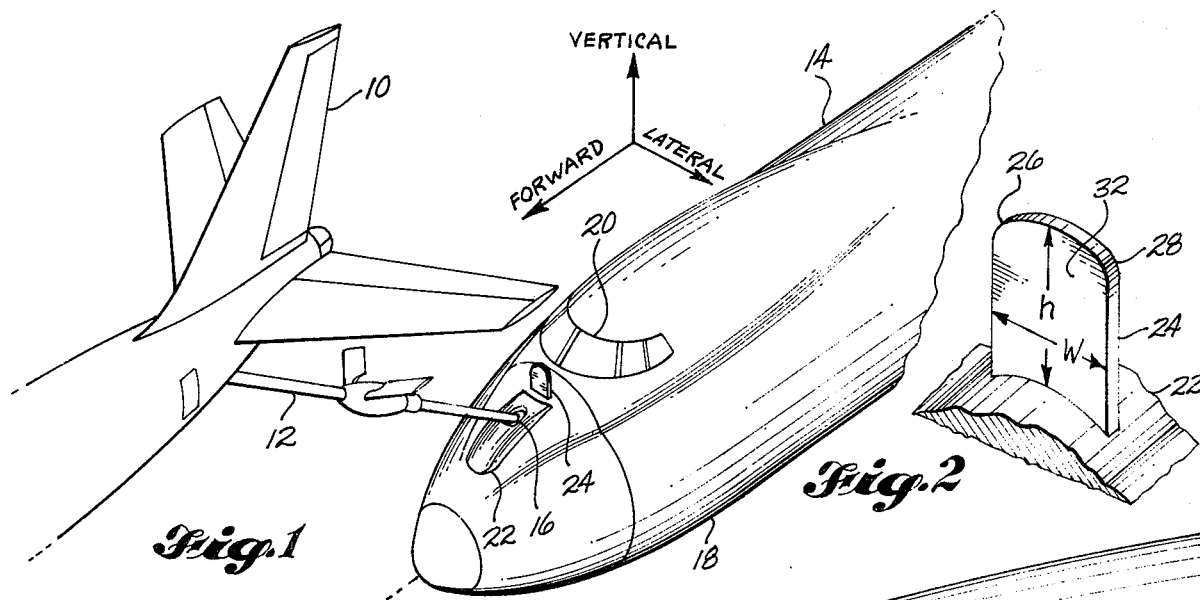
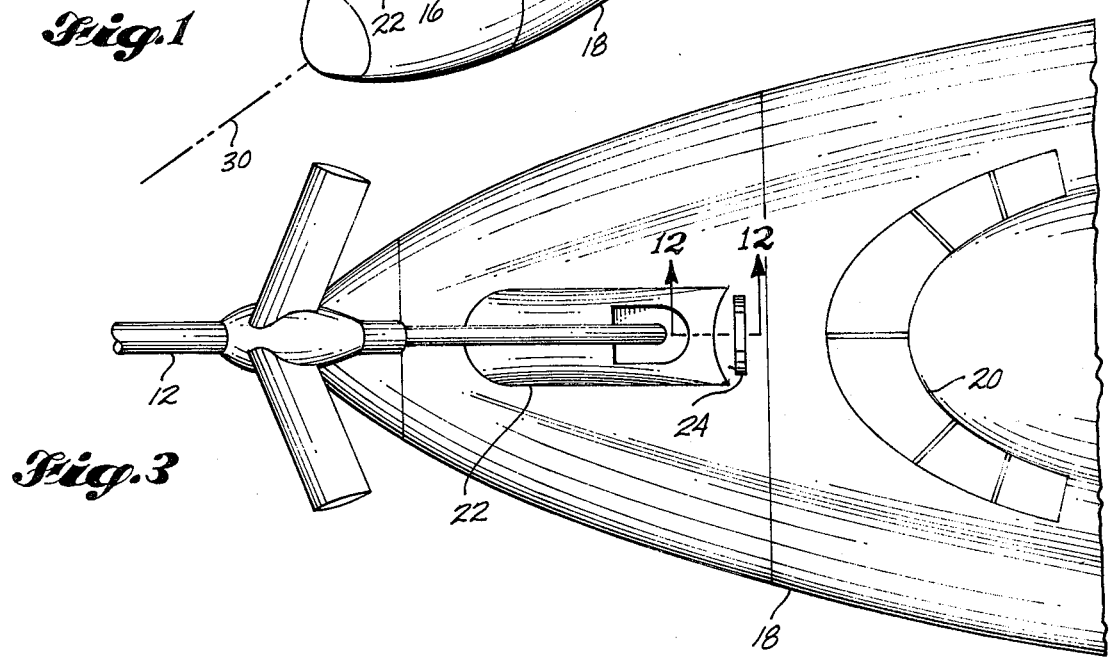
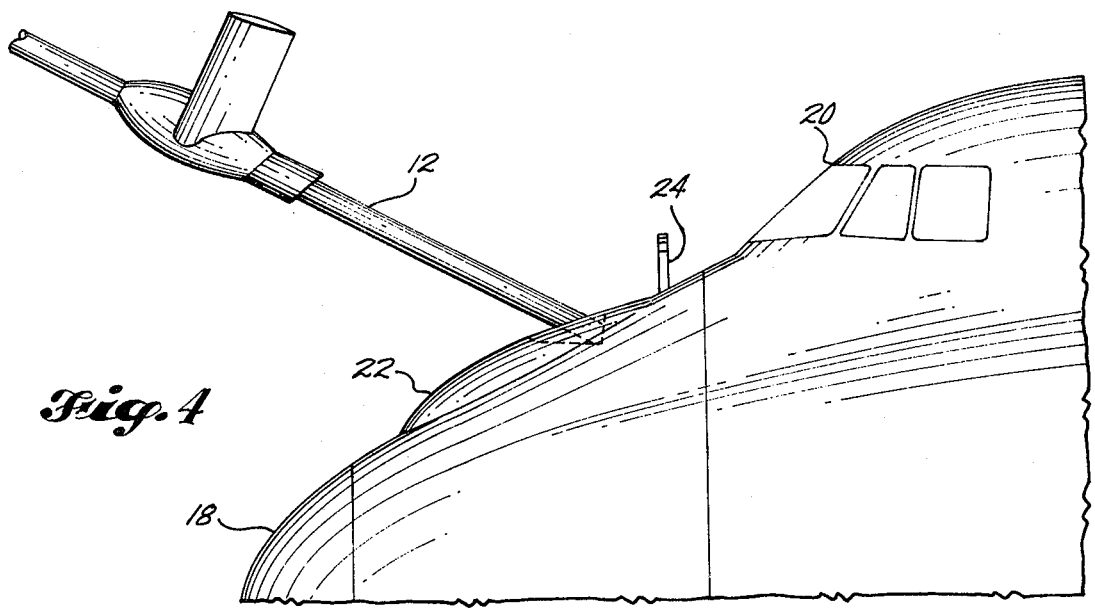

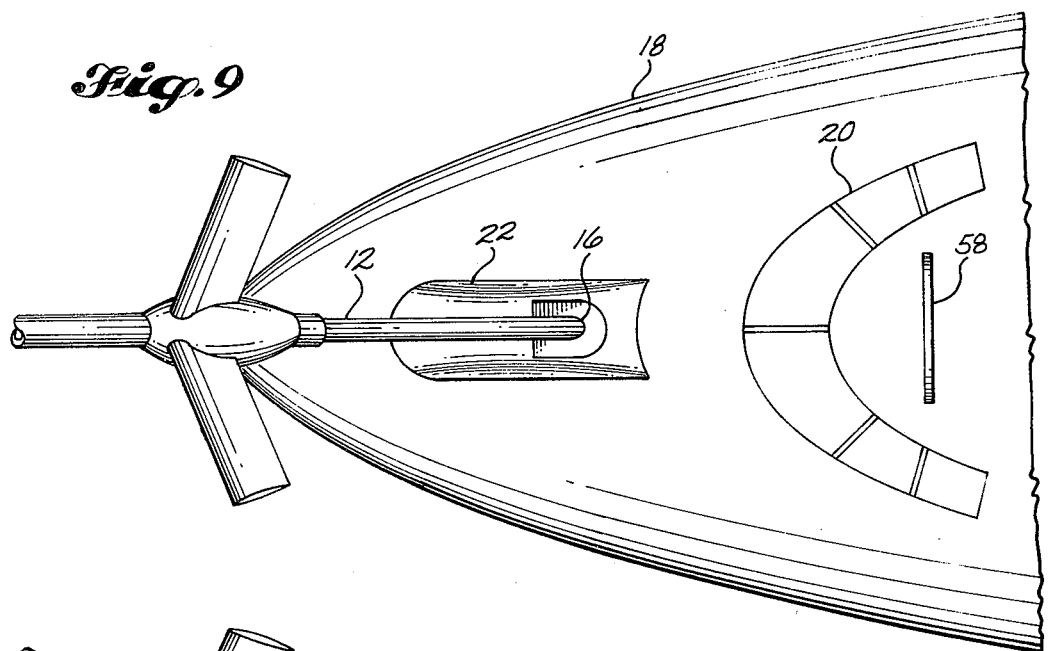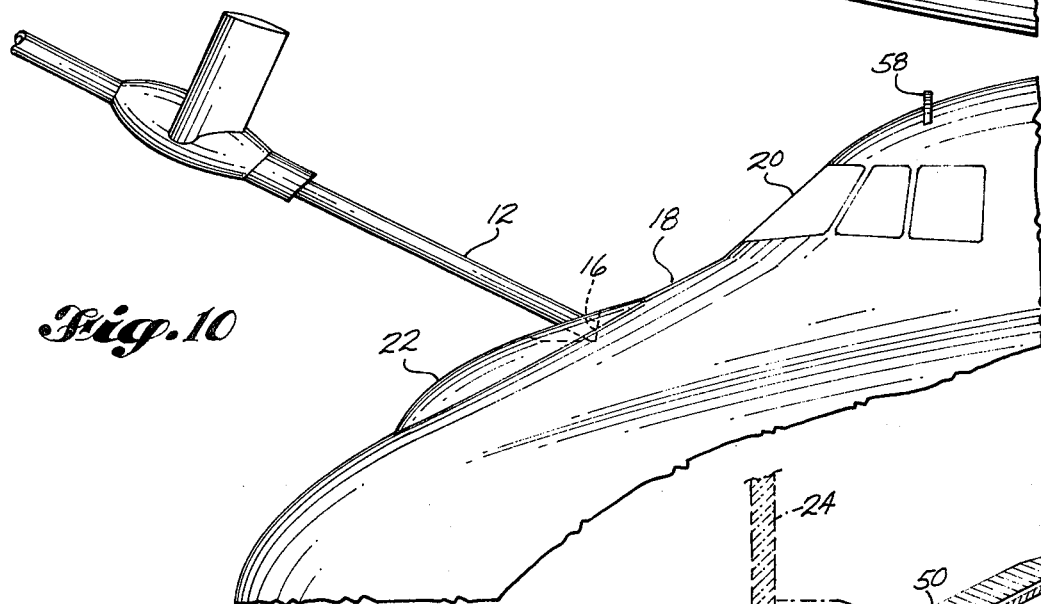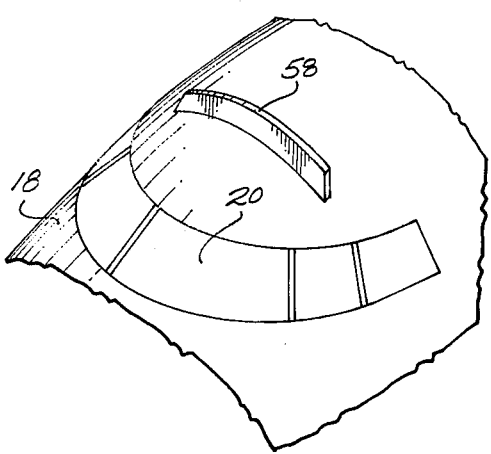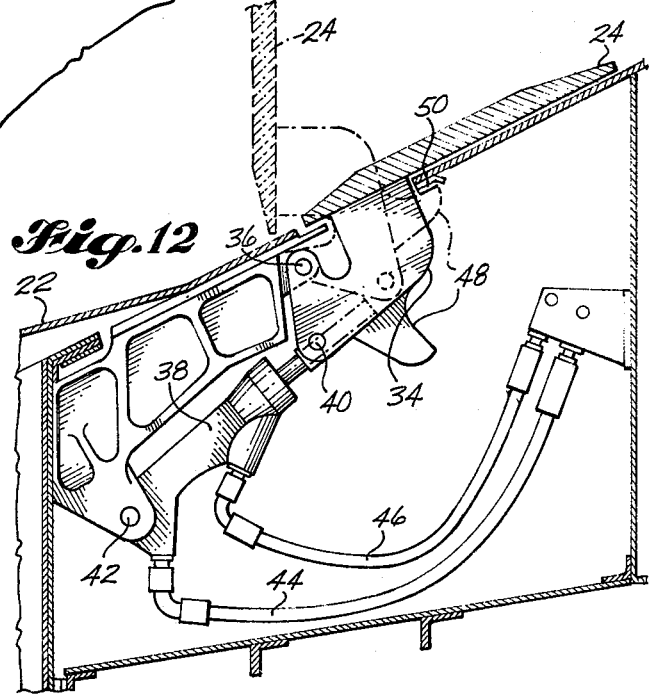

AERIAL REFUELING SPOILER

BACKGROUND OF THE INVENTION

This invention relates generally to a device for producing airflow disturbances, and more specifically, to an aerodynamic spoiler mounted on the upper forward surface of the fuselage of an aircraft equipped to be refueled while in flight for masking or reducing the flow disturbances on the upper part of the fuselage caused by flow disturbances generated by the refueling boom.

One problem which has been encountered in aerial refueling operations involves pitch instability in the aircraft receiving fuel. These instabilities have been particularily noted where the receiving aircraft has its refueling receptacle located on the upper forward part of the fuselage and occur when the receiving aircraft moves in the close proximity to the refueling boom. As the aircraft and the boom come into close proximity during hook-up, the aircraft begins to oscillate in pitch, causing a considerable and, in some cases, unacceptable increase in workload for the pilot. A previous solution to the problem has been to modify the autopilot by adding special modes for use during refueling. This solution however, is somewhat expensive and does not totally eliminate the fluctuations.

In an effort to more precisely define the nature of the problem a flight test program was conducted with a particular jet transport aircraft, having a refueling receptacle in the nose section just forward of the cockpit. In the tests, a number of tufts were attached to the nose in the vicinity of the refueling receptacle and on the roof of the cockpit aft of the windshield. When the aircraft was brought in the close proximity of the refueling boom, it was noted that the tufts in the vicinity of the receptacle remained smooth, but that those on the cockpit roof showed significant activity. Such activity by the tufts was an indication that the airflow in that area had been disturbed. It was also found that the extent of the area in which disturbance occurred depended to some degree upon the relative position of the receiving aircraft with respect to the refueling aircraft during refueling.

The practical effect of this flow disturbance was to cause a decrease in the lift over that portion of the fuselage where the disturbance occurred and resultant nose-down moment on the aircraft. Because the lift loss and nose-down moment varied with the relative positions of the two aircraft, pilots found it quite difficult to stabilize or trim the receiving aircraft during refueling.

After reviewing the flight test data, the Applicants concluded that the flow disturbance was in all probability caused by turbulence from the boom. They also felt that an aerodynamic solution to the problem might be possible if a device could be mounted on the receiving aircraft which would either (a) generate a flow disturbance large enough to mask the disturbance caused by the boom, or (b) tend to reconstruct the flow over the cabin roof. With these two objectives in mind, four species of the present invention were conceived, and the effectiveness of each was verified by wind tunnel testing.

Accordingly, it is an object of this invention to provide for an aerodynamic means for eliminating pitch instabilities in an aircraft receiving fuel during aerial refueling. Another object of this invention is to provide for an aerodynamic means of producing flow disturbances and/or flow separation on the upper forebody of an aircraft receiving fuel during aerial refueling in order to mask the effect of turbulence from the refueling boom. A further objective of this invention is to provide for an aerodynamic means for reducing the flow disturbance over the upper forebody of the receiving aircraft initiated by turbulence from the refueling boom.

SUMMARY OF THE INVENTION

In summary, this invention can be most broadly described as a combination which includes an aircraft having an apparatus for receiving fuel while in flight including a refueling receptacle mounted on the surface of its fuselage, and further includes an aerodynamic means mounted on the upper forward surface of the fuselage for improving the pitch stability of the aircraft during aerial refueling.

BRIEF DESCRIPTION OF THE DRAWINGS

FIG. 1 is a perspective view showing one species of this invention installed on the nose section of an aircraft receiving fuel and also shows the refueling boom and the tail of the refueling aircraft.

FIG. 2 is a perspective view showing the species of FIG. 1 in greater detail.

FIG. 3 is a top view of the nose section of the receiving aircraft and species of FIG. 1.

FIG. 4 is a side view of the same nose section and species.

FIG. 9 is a top view of the nose section of the receiving aircraft showing a fourth species of this invention installed on the roof of the cockpit.

FIG. 10 is a side view of the nose section and species of FIG. 9.

FIG. 11 is a perspective view of a portion of the cockpit roof of FIG. 9.

FIG. 12 is a partial section taken at 12—12 in FIG. 3.

DESCRIPTION OF THE PREFERRED EMBODIMENT

Figure 5:
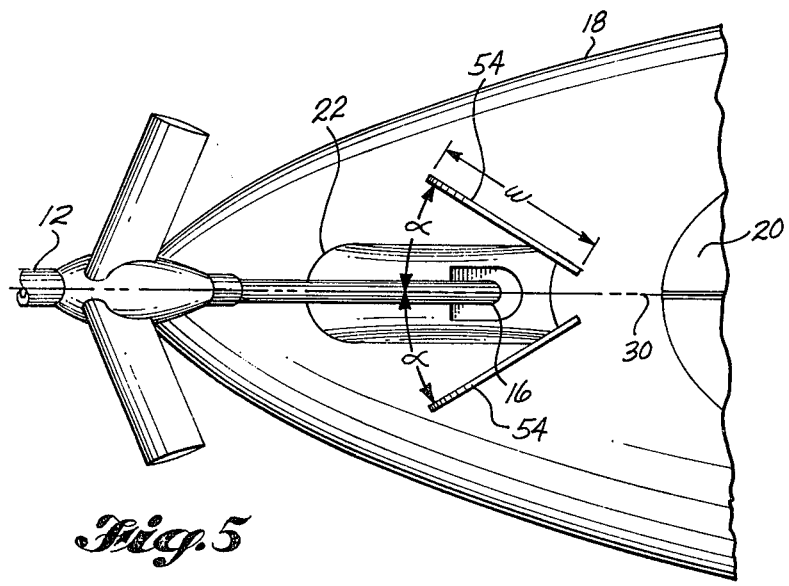
FIG. 5 is a top view of the nose section of the receiving aircraft on which a second species of this invention has been installed.

In FIG. 1, two aircraft are shown engaged in an aerial refueling operation. Fuel is passed from the refueling aircraft through a refueling boom 12 to the receiving aircraft 14. The boom has been inserted and secured in a refueling receptacle 16 which is located in the upper forward part of the fuselage 18 of the receiving aircraft just forward of the cockpit windshield 20. Mounted just aft of the refueling receptacle 16 near the aft end of the receptacle fairing 22 is is a spoiler plate 24 which has an approximate height $h$ of 12 inches and a width $w$ of 24 inches. The plate is nominally rectangular with rounded corners 26 and 28 as shown in FIG. 2, but the shape may be varied as desired to suit a different installation. Also, the plate is shown as extending upward in the vertical direction from the surface of the nose (that is, perpendicular to the longitudinal axis 30 of the receiving aircraft) but it would still function effectively if tilted somewhat off the vertical. Ordinarily it would be desirable to orient the plate so that a normal face 32 of the plate would be perpendicular to the pitch axis of the aircraft (not shown) to eliminate undesirable lateral forces on the plate. The details of mounting the plate to the fuselage of any particular aircraft should be obvious to those skilled in the art taking into consideration the local structure of the aircraft and the anticipated airloads on the spoiler plate.

The height, width, and exact location of the spoiler on a particular aircraft should be chosen in view of the location of the refueling receptacle and the area over which the flow disturbances occurs. The purpose of the spoiler is to produce a pattern of flow turbulence which will cause flow disturbance in the same area as the boom does, thereby masking the effect of the boom. Of course, the spoiler plate will itself cause flow separation and a nose-down moment in the aircraft but the effect will be steady in nature and can be trimmed out by the pilot, unlike the pitching oscillations caused by the boom turbulence. In designing a spoiler plate for a particular aircraft, the disturbance patterns caused by the boom may be determined by examining tuft patterns from wind tunnel or flight tests or by some other appropriate method. Once these patterns have been determined, the plate can be sized by combined theoretical methods and wind tunnel tests employing techniques well known to those skilled in the art. The spoiler plate is further shown in the top and side views of FIGS. 3 and 4, respectively.

Pitch trim instability during aerial refueling operations has been noted in numerous types of aircraft. It is believed that this invention may be useful in overcoming this problem in cases where it is caused by turbulence from the refueling boom, and particularly in cases where the boom turbulence is causing changes in the lift distribution over the forward part of the fuselage.

Because of the drag and increased level of cockpit noise produced by the spoiler plate, it is desirable to provide some means for removing the plate from the airstream or retracting it into the fuselage when refueling operations have been completed. One such means is shown in FIG. 12 which is a section view taken at 12—12 in FIG. 3. In this view, spoiler plate 24 is shown in dotted lines in its extended position, and in solid lines in a stowed position where it lies approximately flush with the fuselage surface. The plate is attached to arm 34 which is pivotally mounted to the fuselage structure at point 36. The plate is moved between its extended and retracted positions by means of hydraulic actuator 38 which is pivotally mounted to arm 34 at point 40 and to the fuselage structure at point 42. Hydraulic pressure is supplied to the actuator through lines 44 and 46. When the plate is in the extended position, stop 48 rests against support 50 as shown.

Figure 6:
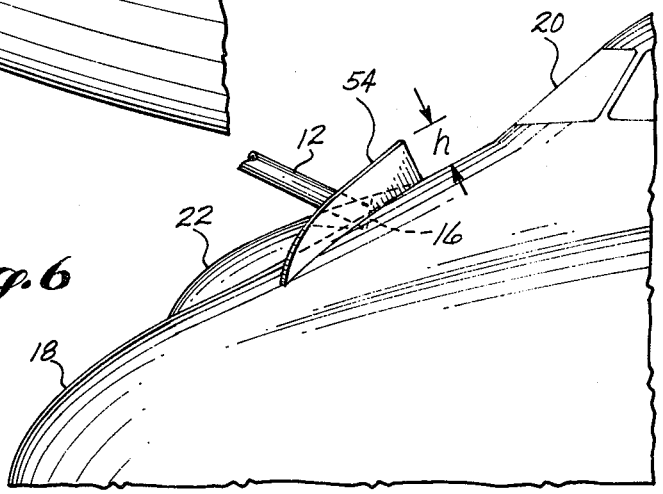
FIG. 6 is a side view of the nose section and species of FIG. 5.

The second species of the invention is shown in FIGS. 5 and 6. In this embodiment, the invention consists of a pair of fences 54, which are mounted on the upper surface of the nose section of the receiving aircraft, forward of windshield 20, and on either side of refueling receptacle 16. In this embodiment, the fences are located symmetrically with respect to the longitudinal axis (or fuselage center line) 30, and each are placed at an acute angle a with respect to that axis. As with the spoiler plate, the exact height $h$, width $w$ and location of the fences can be varied to suit specific configurations and turbulence patterns. Each of the fences is shown mounted in a substantially vertical position but they will still function effectively if canted off the vertical somewhat. Testing has shown that the effect of the fences is similar to that of the spoiler plate in that they substantially eliminate the effect of boom turbulence on pitch trim. In all probability, the fences generate a pair of counter-rotating vortices which travel aft along the nose section, negating the boom turbulence.

Figure 7:
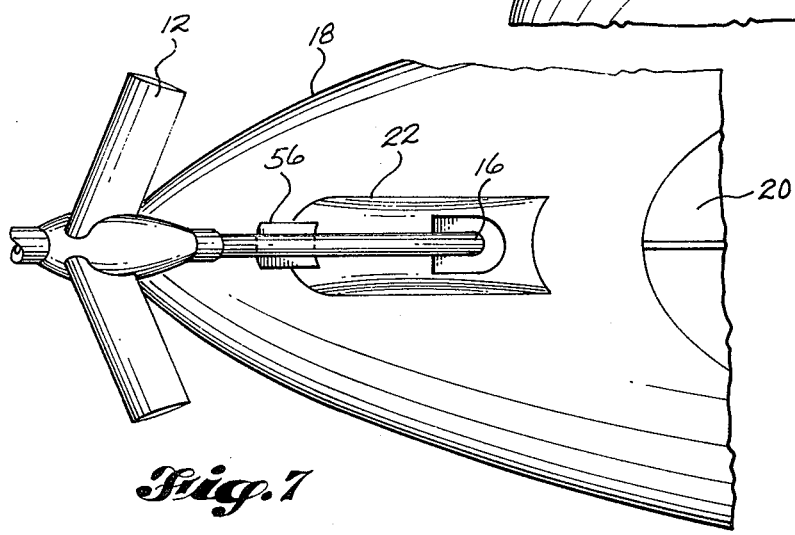
FIG. 7 is a top view of the nose section of the receiving aircraft and a third species of this invention.
Figure 8:
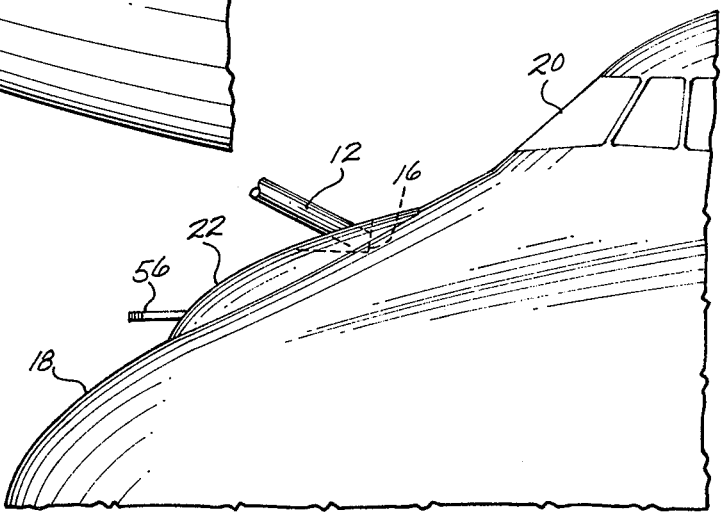
FIG. 8 is a side view of the nose section and species of FIG. 7.

In FIGS. 7 and 8, which are a top and side view, respectively, of nose 18, a further embodiment of this invention is shown which involves a spoiler plate 56 extending horizontally and forward from receptacle fairing 22. As with the fences, the aerodynamic objective of the spoiler is to produce a pair of counter-rotating vortices which will trail aft along the fuselage, shielding the upper portions of the nose and cockpit roof from the effects of boom turbulence.

FIGS. 9 through 11 illustrate a fourth embodiment of this invention which is a spoiler plate 58 mounted on the roof of the cockpit. In this position the spoiler will cause a separation of airflow aft of it in approximately the same region where separation occurs due to boom turbulence. As with spoiler plate 24 the roof spoiler 58 would normally be mounted approximately perpendicular to the direction of local air flow, but it may be canted to some extend fore or aft and still function effectively.

The configurations shown in FIGS. 4 through 10 have not been described in great detail, but in view of the remarks made concerning the design of spoiler plate 24, the details of sizing and locating each of these embodiments on a specific aircraft configuration should be obvious to those skilled in the art. In practice, each of these embodiments should be stowed or retracted when not in use as with spoiler 24, and it should also be obvious to adapt the retracting means described in FIG. 12 to these embodiments.

Thus, in the above disclosure four embodiments of a refueling spoiler have been described, each of which constitutes an aerodynamic means for improving the pitch stability of an aircraft being aerially refueled. Although only four specific embodiments have been described and illustrated, it is to be understood that obvious modifications may be made of them without departing from the true spirit and scope of this invention.

What is claimed is:

1. In combination with an aircraft having an aerial refueling apparatus for receiving fuel while in flight including a refueling receptacle located on the forward surface of its fuselage, the improvement comprising aerodynamic means mounted on said forward surface of the fuselage for improving the pitch stability of the aircraft during aerial refueling wherein said means comprises a spoiler plate having a forward face of height $h$ and width $w$, and a thickness $t$ substantially less than $h$ or $w$, said spoiler plate being oriented such that a normal to said forward face is substantially perpendicular to the pitch axis of the aircraft.

2. The improvement of claim 1 wherein said spoiler plate is located aft of said receptacle and extends upward from said forward surface of the fuselage.

3. The improvement of claim 2 further comprising means for retracting said spoiler plate into a stowed position.

4. The improvement of claim 3 wherein said spoiler plate is pivotally mounted to said fuselage and may be rotated by said means for retracting from an extended position into a stowed position essentially flush with the local fuselage surface.

5. The improvement of claim 1 wherein said aircraft has a cockpit and a cockpit roof located in the upper forward portion of the fuselage and wherein said spoiler plate is located on the roof of said cockpit.

* * * * *